United States Patent [19]

Sasaki et al.

[11] Patent Number: 4,894,415

[45] Date of Patent: Jan. 16, 1990

[54] POLYPHENYLENE ETHER RESIN COMPOSITION

[75] Inventors: Isao Sasaki; Naoki Yamamoto, both of Hiroshima; Akira Yanagase, Otake, all of Japan

[73] Assignee: Mitsubishi Rayon Co., Ltd., Tokyo, Japan

[21] Appl. No.: 95,001

[22] Filed: Sep. 10, 1987

[30] Foreign Application Priority Data

Sep. 11, 1986 [JP] Japan .................... 61-214871

[51] Int. Cl.$^4$ .................... C08F 283/12; C08F 71/04
[52] U.S. Cl. .................... 525/68; 524/151; 524/492; 525/63; 525/479
[58] Field of Search .................... 525/63, 68, 72, 393, 525/479

[56] References Cited

U.S. PATENT DOCUMENTS 4,535,106 8/1985 Abolins et al. .

FOREIGN PATENT DOCUMENTS 2376189 7/1978 France .
46-2345 10/1971 Japan .
47-32731 8/1972 Japan .
55-75444 6/1980 Japan .
1590549 6/1981 United Kingdom .

Primary Examiner—Jacob Ziegler
Attorney, Agent, or Firm—Cushman, Darby & Cushman

[57] ABSTRACT

A polyphenylene ether resin composition comprising
(A) a polyphenylene ether resin,
(B) a polystyrene resin, and
(C) a graft copolymer prepared by graft-polymerizing one or more vinyl monomers onto a compound rubber having an average particle diameter of 0.08 to 0.6 μm and a structure wherein 10 to 90% by weight of a polyorganosiloxane rubber component and 90 to 10% by weight of a polyalkyl (meth)acrylate rubber component are tangled with each other so as not to separate, the total amount of the polyorganosiloxane rubber component and the polyalkyl (meth)acrylate rubber component being 100% by weight of the compound rubber. This resin composition provides molded products superior in impact resistance, heat resistance, mechanical strength, and surface appearance and is superior in moldability and flow properties.

10 Claims, No Drawings

POLYPHENYLENE ETHER RESIN COMPOSITION

BACKGROUND OF THE INVENTION

1. Field of the Invention

The present invention relates to a polyphenylene ether resin composition which provides molded products superior in impact resistance, heat resistance, mechanical strength, and surface appearance and is superior in moldability and flow properties.

2. Description of the Prior Art

Applications of polyphenylene ether resins as engineering plastics are expanding since these resins provide molded products superior in heat resistance, stiffness, etc. However, the applications are restricted in that the molded products are somewhat inferior in surface appearance and impact resistance.

Methods for improving the impact resistance of molded products of polyphenylene ether resins are disclosed in Japanese Patent Publication No. 32731/72, Japanese Patent Application Laid-Open No. 2345/71, etc. These methods comprise blending polybutadiene elastomers with polyphenylene ether resins. According to these methods, however, none of practically useful blends superior in heat stability can be obtained, because unsaturated bonds remain in the blended polybutadiene elastomer and this makes the blend thermally instable.

On the other hand, methods for improving the moldability or processability of polyphenylene ether resins and the impact resistance of molded products of polyphenylene ether resins are disclosed in U.S. Pat. No. 3,361,851, Japanese Patent Publication No. 7069/67, etc. These methods comprise blending polyolefins such as ethylene-propylene copolymers with polyphenylene ether resins. According to these methods, however, the low compatibility of polyphenylene ether resins with the polyolefin may cause delamination in molded products of the blend, when it contains 10% by weight or more of the polyolefin. The surface appearance of such molded products is inferior and the improvement of impact resistance is not much remarkable.

Such being the case, Japanese Patent Application Laid-Open No. 75444/80 and U.S. Pat. No. 4,226,761 disclose methods for improving the impact resistance of polyphyenylene ether resins which comprise blending them with polyorganosiloxane-modified alkenyl aromatic resins and Japanese Patent Publication No. 6379/74 discloses a method for improving the strength of molded products of polyphenylene ether resins which comprises blending them with a polyalkyl(meth)acrylate. However, none of these methods can provide molded products satisfactory in appearance and impact resistance.

SUMMARY OF THE INVENTION

The present invention is directed to a polyphenylene ether resin composition which is superior in moldability and flow properties and provides molded products improved markedly in impact resistance, heat resistance, mechanical strength, and surface appearance without tending to delaminate, the resin composition comprising a polyphenylene ether resin, a polystyrene resin, and a graft copolymer prepared by graft polymerizing a vinyl monomer a high efficiency onto a compound rubber component which consists of a polyorganosiloxane rubber and a polyalkyl (meth)acrylate rubber component.

DETAILED DESCRIPTION OF THE INVENTION

The present inventors made intensive studies of resin compositions for the purpose of improving molded products of polyphenylene ether resins in impact resistance and surface appearance while maintaining their inherent excellence in heat resistance and mechanical strength. As a result it has been found that a graft copolymer produced by graft-polymerizing a vinyl monomer in a high efficiency onto a compound rubber consisting of a polyorganosiloxane rubber component and a polyalkyl (meth)acrylate rubber component, when combined with a polyphenylene ether resin and a polystyrene resin, provides a resin composition, the component resins thereof being good in compatibility one with another, the molded products of the resin composition not delaminating and being improved markedly in impact resistance and surface appearance and superior in heat resistance and mechanical strength, and the resin composition being superior in moldability and flow properties. Based on this finding, the present invention has been accomplished.

Thus, a subject matter of the invention is a polyphenylene ether resin composition comprising (A) a polyphenylene ether resin, (B) a polystyrene resin, and (c) a graft copolymer prepared by graft-polymerizing one or more vinyl monomers onto a compound rubber having an average particle diameter of 0.08 to 0.6 μm and a structure wherein 10 to 90% by weight of a polyorganosiloxane rubber component and 90 to 10% by weight of a polyalkyl (meth)acrylate rubber component are tangled with each other so as not to separate, the total amount of the polyorganosiloxane rubber component and the polyalkyl (meth)acrylate rubber component being 100% by weight of the compound rubber.

The polyphenylene ether resin (A) used in the invention is a homopolymer or copolymer represented by the formula

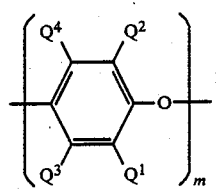

wherein $Q^1$ through $Q^4$ are selected independently of each other from the group consisting of hydrogen and hydrocarbon radicals and m denotes a number of 30 or more.

Examples of such polyphenylene ether resins include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, copolymer of (2,6-dimethyl-1,4-phenylene)ether with (2,3,6-trimethyl-1,4-phenylene)ether, copolymer of (2,6-diethyl-1,4-phenylene)ether with (2,3,6-trimethyl-1,4-phenylene)ether, and copolymer of (2,6-dimethyl-1,4-phenylene)ether with (2,3,6-triethyl-1,4-phenylene)ether. Of these polymers, preferred are poly(2,6-dimethyl-1,4-phenylene)ether and a copolymer of (2,6-dimethyl-1,4-phenylene)ether with (2,3,6-trimethyl-1,4-phenylene)ether and particularly preferred is poly(2,6-dimethyl-1,4-phenylene)ether. These polyphenylene ether resins have compatibility with polystyrene resins in any mixing ratio. There is no particular restriction on the polymerization degree of the polyphenylene ether resin used in the invention. But it is preferable to use the resin having a reduced viscosity of 0.3 to 0.7 dl/g measured in chloroform at 25° C. The resin having a less reduced viscosity than 0.3 dl/g tends to exhibit low heat stability while the resin having a reduced viscosity exceeding 0.7 dl/g tends to have inferior moldability. The above defined polyphenylene ether resins may be used alone or in combination.

The polystyrene resin (B) used in the invention is a homopolymer derived from an aromatic vinyl monomer represented by the formula

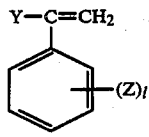

wherein, Y denotes hydrogen or alkyl of 1 to 4 carbon atoms, Z denotes halogen or alkyl of 1 to 4 carbon atoms, and l denotes a number of 0 or 1 to 3, or is a copolymer derived from at least 50% by weight of said aromatic vinyl monomer and another vinyl monomer copolymerizable therewith. Examples of such polystyrene resins include polystyrene, polychlorostyrene, polybromostyrene, poly-α-methylstyrene, styrene-acrylonitrile copolymer, styrene-methyl methacrylate copolymer, styrene-maleic anhydride copolymer, styrene-maleimide copolymer, styrene-N-phenylmaleimide copolymer, and styrene-acrylonitrile-α-methylstyrene terpolymer. In particular, polystyrene is preferable.

The compound-rubber-based graft copolymer (C) used in the invention is prepared by graft polymerizing one or more vinyl monomers onto a compound rubber which consists of 10 to 90% by weight of a polyorganosiloxane rubber component and 90 to 10% by weight of a polyalkyl (meth)acrylate rubber component (the total amount of the two component rubbers is 100% by weight of the compound rubber), these rubber molecules being entangled so that two component rubbers may be substantially inseparable, and the average particle diameter of the compound rubber being from 0.08 to 0.6 μm.

The characteristic of the present inventive resin composition cannot be obtained when the above compound rubber is replaced by either one of the polyorganosiloxane rubber component and the polyalkyl (meth)acrylate rubber component or by a simple mixture of these rubber components. The resin composition that provides molded products having superior impact resistance and surface appearance can be obtained only when the polyorganosiloxane rubber component and the polyalkyl (meth)acrylate rubber component are united into a single compound body by molecular chain entanglement. If the proportion of the polyorganosiloxane rubber that is a component of the compound rubber exceeds 90% by weight, the surface appearance of moldings from the resulting resin composition will become worse. If the proportion of the polyalkyl (meth)acrylate rubber that is a component of the compound rubber exceeds 90% by weight, the impact resistance of moldings from the resulting resin composition will be deteriorated. Hence, the proportions of the two components of the compound rubber should be each in the range of 10 to 90% by weight (where the total amount of both component rubbers should be 100% by weight). In particular, each of the proportions is preferably in the range of 20 to 80% by weight. It is necessary that the average particle diameter of the compound rubber should be within the range of 0.08 to 0.6 μm. If the average particle diameter is less than 0.08 μm, the molding products of the resulting resin composition will have low impact resistance and if the average particle diameter exceeds 0.6 μm, the molded products of the resulting resin composition will have low impact resistance and ill surface appearance. The compound rubber having such an average particle diameter as defined above is best produced by emulsion polymerization method. Preferably, a latex of the polyorganosiloxane rubber is first prepared, then the rubber particles of the latex are impregnated with a monomer for constituting the polyalkyl (meth)acrylate rubber, and thereafter the monomer is polymerized.

The polyorganosiloxane rubber, a component of the compound rubber, can be prepared by emulsion polymerization using an organosiloxane and a crosslinking agent (I) which are described below. In this case, a graft-linking agent (I) can be used additionally.

Suitable organosiloxanes for use herein are of various types including those of three- or more-membered ring structure. In particular, those of three- to six-membered ring structure are favorably used. Such favorable organosiloxanes include, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. These organosiloxanes may be used alone or in combination. The content of organosiloxane in the polyorganosiloxane rubber is at least 50%, preferably at least 70%, by weight.

Suitable crosslinking agents (I) are of tri- or tetrafunctional silane types, including, for example, trimethoxymethylsilane, triethoxyphenylsilane, tetramethoxysilane, tetraethoxysilane, tetra-n-propoxysilane, and tetrabutoxysilane. Of these silanes, preferred are those of the tetra-functional type, and particularly preferred is tetraethoxysilane. Suitable contents of the crosslinking agent in the polyorganosiloxane rubber are from 0.1 to 30% by weight.

The graft-linking agent (I) used is a compound which can form a unit represented by any of the formulae

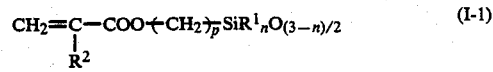

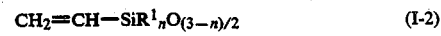

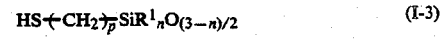

wherein, R¹ denotes methyl, ethyl, propyl, or phenyl, R² denotes hydrogen or methyl, n denotes 0, 1, or 2, and p denotes a number of 1 to 6.

(Meth)Acryloyloxysiloxanes that can form units of formula (I-1) are advantageous in that, these graft-linking agents give high graft efficiencies, hence favoring the formation of effective graft chains and providing high impact resistance. Methacryloyloxysiloxanes are particularly preferable as graft-linking agents which can form units of formula (I-1). Examples of suitable methacryloyloxysiloxanes include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, and δ-methacryloyloxybutyldiethoxymethylsilane. Suitable contents of the graft-linking agent in the polyorganosiloxane rubber are from 0 to 10% by weight.

The latex of the polyorganosiloxane rubber can be produced, for instance, according to the method described in U.S. Pat. Nos. 2,891,920 or 3,294,725. In a preferred embodiment of the present invention, the latex is produced by shear-mixing a solution of cross-linking agent (I) and, if necessary, graft-linking agent (I) in the organosiloxane with water in the presence of a sulfonic acid type emulsifier such as alkylbenzenesulfonic acid or alkylsulfonic acid by using, for example, a homogenizer. Alkylbenzenesulfonic acid is best suited because it acts not only as an emulsifier for the organosiloxane but also as a polymerization initiator. In this case, the joint use of a metal salt of alkylbenzenesulfonic acid, a metal salt of alkylsulfonic acid, or the like is preferable since it is effective in stabilizing the polymer during graft polymerization.

In the next place, the polyalkyl (meth)acrylate rubber, a component of the compound rubber, can be prepared from an alkyl (meth)acrylate, crosslinking agent (II), and graft-linking agent (II) which are cited below.

Suitable alkyl (meth)acrylates include alkyl acrylates, e.g. methyl acrylate, ethyl acrylate, n-propyl acrylate, n-butyl acrylate, and 2-ethylhexyl acrylate and alkyl methacrylates, e.g. hexyl methacrylate, 2-ethylhexyl methacrylate, and n-lauryl methacrylate. In particular, n-butyl acrylate is preferably used.

Suitable crosslinking agents (II) include, for example, ethylene glycol dimethacrylate, propylene glycol dimethacrylate, 1,3-butylene glycol dimethacrylate, and 1,4-butylene glycol dimethacrylate.

Suitable graft-linking agents (II) include, for example, allyl methacrylate, triallyl cyanurate, and triallyl isocyanurate. Allyl methacrylate can be used also as a crosslinking agent. The total content of the crosslinking agent and the graft-linking agent in the polyalkyl (meth)acrylate rubber is from 0.1 to 20% by weight.

The above-mentioned ingredients of the polyalkyl (meth)acrylate rubber are polymerized as follows: A polyorganosiloxane rubber latex prepared as described above is neutralized with an aqueous solution of alkali such as sodium hydroxide, potassium hydroxide, or sodium carbonate, a mixture of the alkyl (meth)acrylate, crosslinking agent (II), and graft-linking agent (II) is added to the neutralized latex to impregnate the polyorganosiloxane rubber particles therewith, and then is polymerized by the action of an ordinary radical polymerization initiator. As the polymerization proceeds, nets of crosslinked polyalkyl (meth)acrylate grow in the already formed nets of crosslinked polyorganosiloxane to form interlocked nets of both the rubbers, thus providing a compound rubber composed of polyorganosiloxane and polyalkyl (meth)acrylate which are substantially inseparable from each other. In the present invention, it is preferable to use a compound rubber in which the main skeleton of polyorganosiloxane rubber has repeating units of dimethylsiloxane and the main skeleton of polyalkyl(meth)acrylate rubber has repeating units of n-butyl acrylate.

The compound rubber prepared as described above permits the graft polymerization of vinyl monomers thereon and the polyorganosiloxane rubber and the polyalkyl (meth)acrylate rubber, which are the components of the compound rubber, are so firmly united with each other by molecular chain entanglement that both the components cannot be separated from each other by the extraction with ordinary organic solvents such as acetone and toluene. The gel content measured by extracting the compound rubber with toluene at 90° C. for 12 hours is at least 80% by weight.

Vinyl monomers which can be graft-polymerized onto the compound rubber include; aromatic alkenyl compounds, e.g. styrene, α-methylstyrene and vinyltoluene; methacrylates, e.g. methyl methacrylate and 2-ethylhexyl methacrylate; acrylates, e.g. methyl acrylate, ethyl acrylate, and butyl acrylate; and vinyl cyanides, e.g. acrylonitrile and methacrylonitrile. These vinyl monomers may be used alone or in combination.

Of these monomers, preferred are aromatic alkenyl compounds and methacrylates and particularly preferred are styrene and methyl methacrylate.

The respective contents of the compound rubber and the polymerized vinyl monomer in the graft copolymer (C) are from 30 to 95%, preferably from 40 to 90%, by weight and from 5 to 70%, preferably from 10 to 60%, by weight based on the weight of the graft copolymer (C). When the content of the polymerized vinyl monomer is less than 5% by weight, the dispersion of the graft copolymer (C) in the resin composition will be insufficient and when the content exceeds 70% by weight, the impact strength of the molded resin composition will be undesirably lowered.

The compound-rubber-based graft copolymer latex has been prepared by adding the above-mentioned vinyl monomer to a latex of the compound rubber and polymerizing the monomer according to a single-stage or multistage radical polymerization technique. The compound-rubber-based graft copolymer (C) can be separated and recovered from a latex thereof by pouring it into hot water in which a metal salt such as calcium chloride or magnesium sulfate has been dissolved thereby salting out and coagulating the graft copolymer.

In the resin composition of the present invention, the proportions of the polyphenylene ether resin (A) (hereinafter referred to as component (A)), the polystyrene resin (B) (hereinafter referred to as component (B)), and the compound-rubber-based graft copolymer (C) (hereinafter referred to as component (C)) can be varied over wide ranges. It is desirable that the respective proportions of components (A), (B), and (C) be from 20 to 80%, from 19 to 75%, and from 1 to 40%, by weight based on the weight of the whole resin composition.

When the proportion of component (A) is less than 20% by weight, the heat resistance of the resin composition tends to be insufficient and when this proportion exceeds 80% by weight, the resin composition tends to exhibit worse flow properties and lower moldability. When the proportion of component (B) is less than 19% by weight, it tends to be difficult to well balance the moldability with the heat resistance and when this proportion exceeds 75% by weight, it tends to be difficult to well balance the impact resistance with the heat resistance. When the proportion of component (C) is less than 1% by weight, the impact resistance tends to be insufficient and when this proportion exceeds 40% by weight, the content of the compound rubber becomes high in consequence and this tends to lower the mechanical strength, making the resin composition unfit for use.

The resin composition of the present invention provides molded products superior in heat resistance and impact resistance, particularly low-temperature impact resistance and is also superior in flow properties. In addition, the heat resistance of the resin composition can be freely designed to change from the level of ultra heat-resistant resins to the level of ordinary heat-resistant resins by varying the ratio of component (A) to component (B). Moreover, the impact resistance and surface appearance of the molded resin composition can be freely designed by varying the proportion of component (C).

Flame retardance can be imparted to the resin composition of the present invention comprising components (A), (B), and (C), by blending a flame-retardant amount of phosphoric ester flame retarder with the resin composition. Examples of such phosphoric ester flame retarders include trimethyl phosphate, triethyl phosphate, tripropyl phosphate, tributyl phosphate, tribenzyl phosphate, trihexyl phosphate, triphenyl phosphate, tricresyl phosphate, trixylyl phosphate, tris(chloroethyl) phosphate, tris(chlorophenyl) phosphate, and tris(dibromopropyl) phosphate. In particular, triphenyl phosphate is preferable.

The amount of phosphoric ester flame retarder contained depends upon the kind of flame retarder, proportions of components (A), (B), and (C) and other factors. Generally, this amount is desired to be in the range of 0.5 to 35 parts by weight per 100 parts by weight of the resin blend comprising components (A) through (C). Thus, it is desirable that the flame-retardant resin composition be composed of 100 parts by weight of the resin blend comprising 20 to 80% by weight of component (A), 19 to 75% by weight of component (B), 1 to 40% by weight of component (C), and 0.5 to 35 parts by weight of said flame retarder per 100 parts by weight of the resin blend.

Moreover, the resin composition of the present invention comprising components (A), (B), and (C) can be reinforced with a reinforcing amount of glass fiber. Desirably, the glass fiber to be incorporated has a diameter of 5 to 50 μm and a filament length of at least 0.2 mm. Suitable surface-treating agents for the glass fiber are aminosilanes, vinylsilanes, epoxysilanes, other silane coupling agents, chromium-containing coupling agents, etc. Suitable binding agents for the glass fiber include those of polyester, epoxy, urethane, acryl-urethane, and ethylene-vinyl acetate families.

Glass fiber is used in an amount of 5 to 100 parts preferably 10 to 70 parts, by weight per 100 parts by weight of the resin blend comprising components (A) through (C). In order to achieve the reinforcing effect, the amount of glass fiber needs to be at least 5 parts by weight. When the amount exceeds 100 parts by weight, the characteristic feature of the present invention is hardly displayed. Thus, the resin composition reinforced with glass fiber is composed desirably of 100 parts by weight of the resin blend comprising 20 to 80% by weight of component (A), 19 to 75% by weight of component (B), 1 to 40% by weight of component (C), and 5 to 100 parts by weight of glass fiber per 100 parts by weight of the resin blend.

In carrying out the present invention, the above-mentioned phosphoric ester flame retarder can also be used jointly with glass fiber. In this case, the flame retarder and the glass fiber are used desirably in amounts of 0.5 to 35 parts and 5 to 100 parts, respectively, by weight per 100 parts by weight of the resin blend comprising components (A) through (C).

The resin composition of the present invention may be prepared by mechanical intermixing of components (A), (B), and (C) and as occasion demands, the phosphoric ester flame retarder and/or glass fiber using a known apparatus such as a Banbury mixer, roll mill, or twin-screw extruder, followed by pelletizing.

If necessary, the resin composition of the present invention may further contain additives selected from stabilizers, plasticizers, lubricants, pigments, fillers, etc. Such additives include; stabilizers, e.g. triphenyl phosphite; lubricants, e.g. polyethylene wax and polypropylene wax; pigments, e.g. titanium oxide, zinc sulfide, and zinc oxide; and fillers, e.g. asbestos, wollastonite, mica, and talc.

EXAMPLE

The present invention is illustrated in more detail with reference to the following examples. In the following description, parts are all by weight.

In the following examples and comparative examples, methods used for measuring properties are as follows:

Flexural strength:
  Measured in accordance with ASTM D 790.
Izod impact strength:
  Measured in accordance with ASTM D 256 (1/4" notched)
Vicat softening temperature:
  Measured in accordance with ISO R 306.
Melt index:
  Measured according to a method based on ASTM D 1238 (applying a load of 5 kg at 275° C.)
Gloss:
  Measured in accordance with ASTM D 523-62 T (60° specular gloss).

REFERENCE EXAMPLE 1

Preparation of compound-rubber-based graft copolymer (S-1):

A mixture of 2 parts of tetraethoxysilane, 0.5 part of γ-methacryloyloxypropyldimethoxymethylsilane, and 97.5 parts of octamethylcyclotetrasiloxane was added to 200 parts of distilled water containing 1 part of sodium dodecylbenzenesulfonate and 1 part of dodecylbenzenesulfonic acid. The mixture was stirred preliminarily in a home-mixer at 10,000 rpm and then emulsified by means of a homogenizer under a pressure of 300 kg/cm$^2$, giving an organosiloxane latex. This latex was poured into a separable flask equipped with a condenser and a stirrer, then was heated with stirring at 80° C. for 5 hours, allowed to stand at 20° C for 48 hours, and neutralized with aqueous sodium hydroxide to pH 6.9 to end the polymerization, thus yielding a polyorganosiloxane rubber latex-1. The polymerization yield was 89.7% and the average particle size of the rubber was 0.16 μm.

117 Parts of this polyorganosiloxane rubber latex-1 was charged in a separable flask equipped with a stirrer, and 57.5 parts of distilled water was added. After replacement of the air with nitrogen, the diluted latex was heated to 50° C., and a mixture of 33.95 parts of n-butyl acrylate, 1.05 parts of allyl methacrylate, and 0.26 part of t-butyl hydroperoxide was added. The whole mixture was stirred for 30 minutes to allow these monomers and hydroperoxide to penetrate into the particles of the polyorganosiloxane rubber. Then, a mixture of 0.002 part of ferrous sulfate, 0.006 part of disodium ethylenediaminetetraacetate, 0.26 part of Rongalite, and 5 parts of distilled water was added to initiate the radical polymerization of the acrylate. The temperature of the reaction mixture was maintained at 70° C. for 2 hours to end the polymerization, thus yielding a compound rubber latex. From measurement on a sample of this compound latex the average particle diameter of this compound rubber was found to be 0.19 μm. Another sample of the latex was dried up, the resulting solid was subjected to extraction with toluene at 90° C. for 12 hours to measure the gel content, which was found to be 97.3% by weight. A mixture of 0.12 part of t-butyl hydroperoxide and 30 part of styrene was added dropwise to the thus obtained compound rubber latex at 70° C. over 15 minutes, and this temperature was further maintained for 4 hours to end the graft polymerization onto the compound rubber. The percentage of styrene polymerized was 91.5%. The graft copolymer latex obtained was added dropwise to 200 parts of hot water containing 1.5% by weight of calcium chloride to coagulate the polymer, which was then separated, washed, and dried at 75° C. for 16 hours, yielding 97.8 parts of a dry powder of compound-rubber-based graft copolymer (hereinafter designated as S-1).

REFERENCE EXAMPLE 2

Preparation of compound-rubber-based graft copolymer (S-2):

A mixture of 2 parts of tetraethoxysilane and 98 parts of octamethylcyclotetrasiloxane was added to 200 parts of distilled water containing 1 part of sodium dodecylbenzenesulfonate and 1 part of dodecylbenzenesulfonic acid. Similarly to the preparation of S-1, the mixture was dispersed preliminarily, emulsified by means of a homogenizer, heated at 80° C. for 5 hours, then cooled and allowed to stand at 20° C. for 48 hours, and neutralized with aqueous sodium hydroxide to pH 6.9 to end the polymerization. Thus, a polyorganosiloxane rubber latex-2 was obtained in a polymerization yield of 88.9%. The average particle diameter of this rubber was 0.16 μm.

After addition of 57.5 parts of distilled water to 117 parts of the polyorganosiloxane rubber latex-2, a mixture of 33.95 parts of n-butyl acrylate, 1.05 parts of allyl methacrylate, and 0.26 part of t-butyl hydroperoxide was further added. Then, the polymerization to produce a compound rubber was carried out in the same manner under the same conditions as in the preparation of S-1. The average particle diameter of this compound rubber was 0.20 μm and the gel content thereof measured similarly to Reference Example 1 by the toluene extraction method was 92.4% by weight. A mixture of 30 parts of styrene and 0.12 part of t-butyl hydroperoxide was added to the compound rubber latex obtained, and the graft polymerization was carried out in the same manner under the same conditions as in the preparation of S-1. From the resulting graft copolymer latex, 97.6 parts of a dry powder of compound-rubber-based graft copolymer (hereinafter designated as S-2) was obtained through coagulation, separation, and drying treatment in the same manner as in Reference Example 1.

REFERENCE EXAMPLE 3

Preparation of compound-rubber-based graft copolymers S-3 through S-6:

Using portions of the polyorganosiloxane rubber latex-1 prepared in Reference Example 1, compound-rubber-based graft copolymers different in the polyorganosiloxane rubber-to-butyl acrylate rubber ratio from S-1 were prepared as follows:

Compound rubber latexes 3–6 were prepared according to the procedure of Reference Example 1 but using materials in proportions listed below.

| Charged material | No. of compound rubber latex | | | |
|---|---|---|---|---|
| | 3 | 4 | 5 | 6 |
| Polyorganosiloxane rubber latex-1 (part) | 16.7 | 66.7 | 166.7 | 216.7 |
| Distilled water (part) | 150 | 150 | 0 | 0 |
| Butyl acrylate (part) | 63.1 | 48.5 | 19.7 | 4.9 |
| Allyl methacrylate (part) | 2 | 1.5 | 0.3 | 0.1 |
| t-Butyl hydroperoxide (part) | 0.26 | 0.26 | 0.08 | 0.02 |
| Average particle diameter (μm) of compound rubber | 0.30 | 0.23 | 0.16 | 0.14 |
| Gel content (wt %) of compound rubber | 96.3 | 94.5 | 90.4 | 93.2 |

A mixture of 30 parts of styrene and 0.12 part of t-butyl hydroperoxide was added to each compound rubber latex, and the graft polymerization was conducted in the same manner under the same conditions as in Reference Example 1. Then, dry powders of compound-rubber-based graft copolymers (hereinafter designated as S-3 through S-6) were obtained from the resulting latexes through coagulatin, separation, and drying treatment in the same manner as in Reference Example 1.

REFERENCE EXAMPLE 4

Preparation of compound-rubber-based graft copolymers (S-7) and (S-8):

Two compound-rubber-based graft copolymers were prepared by using portions of the polyorganosiloxane rubber latex-1 prepared in Reference Example 1 and different amounts of styrene.

That is, 117 parts of the siloxane rubber latex-1 and 200 parts of distilled water were charged in a separable flask equipped with a stirrer. After replacement of the air with nitrogen, the diluted latex was heated to 50° C., a mixture of 33.95 parts of n-butyl acrylate, 1.05 parts of allyl methacrylate, and 0.26 part of t-butyl hydroperoxide was added, and the whole mixture was stirred for 30 minutes. Further, a mixture of 0.002 part of ferrous sulfate, 0.006 part of disodium ethylenediaminetetraacetate, 0.26 part of Rongalite, and 5 parts of distilled water was added to initiate the polymerization to prepare a compound rubber latex. The average particle diameter of this compound rubber was 0.19 μm and the gel content measured by the toluene extraction method in the same manner as in Reference Example 1 was 97.3% by weight. A mixture of 50 parts of styrene and 0.2 part of t-butyl hydroperoxide was added dropwise to the compound rubber latex at 70° C. over 15 minutes, and this temperature was further maintained for 4 hours to end the graft polymerization onto the compound rubber. Then, a dry powder of compound-rubber-based graft copolymer (hereinafter designated as S-7) was obtained through coagulation, separation, and drying treatment in the same manner as in Reference Example 1.

Also a dry powder of compound-rubber-based graft copolymer (hereinafter designated as S-8) was obtained by graft polymerization according to the procedure of preparing S-7, except that a mixture of 10 parts of styrene and 0.04 part of t-butyl hydroperoxide was added to the compound rubber latex, followed by coagulation, separation, and drying treatment in the same manner as in Reference Example 1.

REFERENCE EXAMPLE 5

Preparation of graft copolymer (S-9):

117 Parts of the polyorganosiloxane rubber latex-1 and 57.5 parts of distilled water were charged in a separable flask equipped with a stirrer. After replacement of the air with nitrogen, the diluted latex was heated to 50° C., a mixture of 33.95 parts of n-butyl acrylate and 0.26 part of t-butyl hydroperoxide was added, and the whole mixture was stirred for 30 minutes. Then, the emulsion polymerization of the acrylate was carried out by adding the same amount of the same redox type initiator mixture as used in Reference Example 1, giving a rubber latex. Unlike Reference Example 1, allyl methacrylat was not added in this case. The average particle diameter of the rubber in this latex was 0.22 μm and the gel content measured by the toluene extraction method was 63% by weight. A mixture of 30 parts of styrene and 0.12 part of t-butyl hydroperoxide was added dropwise to this rubber latex at 70° C. over 15 minutes, and this temperature was maintained for 4 hours to carry out the graft polymerization. Then, a dry powder of graft copolymer (hereinafter designated as S-9) was obtained through coagulation, separation, and drying treatment in the same manner as in Reference Example 1.

REFERENCE EXAMPLE 6

Preparation of graft copolymer (S-10):

117 Parts of the polyorganosiloxane rubber latex-1 and 57.5 parts of distilled water were charged in a separable flask equipped with a stirrer. After replacement of the air with nitrogen, a mixture of 35 parts of n-butyl acrylate, 30 parts of styrene, and 0.26 part of t-butyl hydroperoxide was added dropwise to the diluted latex at 70° C. over 30 minutes in the presence of the same amount of the same redox type initiator mixture as used in Reference Example 1, thereby allowing the graft polymerization to proceed. The temperature of the reaction mixture was maintained at 70° C. for 4 further hours to end the polymerization. Then, a dry powder of graft copolymer (hereinafter designated as S-10) was obtained through coagulation, separation, and drying treatment in the same manner as in Reference Example 1.

REFERENCE EXAMPLE 7

Preparation of compound-rubber-based graft copolymer (S-12):

A mixture of 2 parts of tetraethoxysilane, 0.5 part of γ-methacryloyloxypropyldimethoxymethylsilane, and 97.5 parts of octamethylcyclotetrasiloxane was added to 200 parts of distilled water containing 4 parts of dodecylbenzenesulfonic acid and 2 parts of sodium dodecylbenzenesulfonate. Similarly to the preparation of S-1, the preliminary dispersion by means of a homomixer and the emulsification by means of a homogenizer were conducted. The resulting emulsion was heated at 80° C. for 5 hours, then cooled and allowed to stand at 20° C. for 48 hours, and neutralized with aqueous sodium hydroxide to pH 7.0 to end the polymerization, thus yielding a polyorganosiloxane rubber latex-3. The polymerization yield was 89.6% and the average particle diameter of this rubber was 0.05 μm.

After addition of 57.5 parts of distilled water to 117 parts of the polyorganosiloxane rubber latex-3, a mixture of 33.95 parts of n-butyl acrylate, 1.05 parts of allyl methacrylate, and 0.26 part of t-butyl hydroperoxide was further added. Then, the polymerization to produce a compound rubber was carried out in the same manner under the same conditions as in the preparation of S-1. The average particle diameter of the resulting compound rubber was 0.07 μm and the gel content thereof measured similarly to Reference Example 1 by the toluene extraction method was 95.8% by weight. A mixture of 30 parts of styrene and 0.12 part of t-butyl hydroperoxide was added to the compound rubber latex obtained, and the graft polymerization was carried out in the same manner under the same conditions as in the preparation of S-1. From the resulting graft copolymer latex, a dry powder of compound-rubber-based graft copolymer (hereinafter designated as S-12) was obtained through coagulation, separation, and drying treatment in the same manner as in Reference Example 1.

REFERENCE EXAMPLE 8

Preparation of compound-rubber-based graft copolymer (S-13):

100 Parts of the same mixture of siloxanes as used in Reference Example 7 was prepared, 200 parts of distilled water containing 0.2 part of dodecylbenzenesulfonic acid only was added thereto, the mixture was stirred preliminarily in a homomixer at 10,000 rpm and then emulsified by means of a homogenizer under a pressure of 140 kg/cm$^2$, giving an organosiloxane latex. This latex was heated at 80° C. for 5 hours, then allowed to stand at 5° C. for 1 month, and neutralized with aqueous sodium hydroxide to pH 7.0 to end the polymerization, thus yielding a polyorganosiloxane rubber latex-4. The polymerization yield was 88.4% and the average particle diameter of this rubber was 0.48 μm.

After addition of 57.5 parts of distilled water to 117 parts of the polyorganosiloxane rubber latex-4, the polymerization to produce a compound rubber was carried out in the same manner under the same conditions as in the preparation of S-12. The average particle diameter of the compound rubber in this latex was 0.7 μm and the gel content measured by the toluene extraction in the same manner as in Reference Example 1 was 94.3% by weight. A mixture of 30 parts of styrene and 0.12 part of t-butyl hydroperoxide was added to this compound rubber latex, and the graft polymerization was carried out in the same manner under the same conditions as in the preparation of S-1. From the thus obtained graft copolymer latex, a dry powder of compound-rubber-based graft copolymer (hereinafter designated as S-13) was obtained through coagulation, separation, and drying treatment in the same manner as in Reference Example 1.

REFERENCE EXAMPLE 9

Preparation of blended-rubber-based graft copolymer (S-14):

195 Parts of distilled water containing 1 part of sodium dodecylbenzenesulfonate was charged into a separable flask equipped with a stirrer, a mixture of 97 parts of n-butyl acrylate, 3 parts of allyl methacrylate, and 0.24 part of t-butyl hydroperoxide was charged into the separable flask and emulsified in the emulsifier-containing water, and the air was replaced with nitrogen. Then, the emulsion was heated to 60° C., and a mixture of 0.002 part of ferrous sulfate, 0.006 part of disodium ethylenediaminetetraacetate, 0.26 part of Rongalite, and 5 parts of distilled water was added to initiate the polymerization, which was continued at 70° C. for 2 hours, yielding a poly-n-butyl acrylate rubber latex.

106 Parts (35 parts as solids) of the thus prepared poly-n-butyl acrylate rubber latex, mixed with 117 parts of the polyorganosiloxane rubber latex-1 prepared in Reference Example 1, was charged in a separable flask equipped with a stirrer, and was heated to 70° C. A mixture of 0.0013 part of ferrous sulfate, 0.004 part of disodium ethylenediaminetetraacetate, 0.17 part of Rongalite, and 5 parts of distilled water was further charged into the flask. Then, a mixture of 30 parts of styrene and 0.12 part of t-butyl hydroperoxide was added dropwise at 70° C. over 15 minutes, and this temperature was maintained for 4 further hours to end the graft polymerization onto the blend of the polyorganosiloxane rubber and the poly-n-butyl acrylate. The percentage of styrene polymerized was 92.6%. The resulting graft copolymer latex was added dropwise to 300 parts of hot water containing 1.5% by weight of calcium chloride to coagulate the polymer, which was then separated, washed and dried at 75° C. for 16 hours, thus yielding 98 parts of a dry powder of blended-rubber-based graft copolymer (hereinafter designated as S-14).

REFERENCE EXAMPLE 10

264 Parts each of the compound rubber latexes obtained in Reference Examples 1 and 2, respectively, was charged in a separable flask equipped with a stirrer. After replacement of the air with nitrogen, each latex was heated to 60° C., and a mixture of 30 parts of methyl methacrylate and 0.08 part of cumene hydroperoxide was added dropwise to the respective latex over 1 hour. Then the reaction temperature of 60° C. was maintained for 2 hours to end the polymerization. The percentages of methyl methacrylate polymerized were 98.0% and 98.3%, respectively. Graft copolymer latexes obtained were each added dropwise to 200 parts of hot water containing 1.5% by weight of calcium chloride to coagulate each polymer, which was then separated, washed, and dried at 80° C. for 16 hours, thus yielding 98.2 parts of a compound-rubber-based graft copolymer S-15 and 98.6 parts of a similar copolymer S-16.

REFERENCE EXAMPLE 11

According to the procedure of Reference Example 10, graft polymerization was conducted by adding a mixture of 30 parts of methyl methacrylate and 0.08 part of cumene hydroperoxide to 232 parts, 267 parts, 187 parts and 222 parts each of compound rubber latexes 3 through 6, respectively, which were different in the polyorganosiloxane rubber-to-butyl acrylate rubber ratio. Then, dry powders of compound-rubber-based graft copolymers S-17 through S-20 were obtained by subjecting the resulting latexes to coagulation, separation, and drying treatment in the same manner as in Reference Example 1.

REFERENCE EXAMPLE 12

Two compound-rubber-based graft copolymers containing different amounts of methyl methacrylate polymerized were prepared in the following manner by using the polyorganosiloxane rubber latex-1 prepared in yielding the compound-rubber-based graft copolymer S-1.

That is, 117 parts of the siloxane rubber latex-1 and 200 parts of distilled water were charged in a separable flask equipped with a stirrer. After replacement of the air with nitrogen, the diluted latex was heated to 50° C., and thereto was added a mixture of 33.95 parts of n-butyl acrylate, 1.05 parts of allyl methacrylate, and 0.26 part of t-butyl hydroperoxide. After stirring of the contents for 30 minutes, a mixture of 0.002 part of ferrous sulfate, 0.006 part of disodium ethylenediaminetetraacetate, 0.26 part of Rongalite, and 5 parts of distilled water was added to initiate the polymerization and prepare a compound rubber latex. The average particle diameter of this compound rubber was 0.19 μm and the gel content measured by the toluene extraction method in the same manner as in Reference Example 1 was 97.3% by weight. Subsequently, a mixture of 50 parts of methyl methacrylate and 0.2 part of cumene hydroperoxide was added dropwise to this compound rubber latex at 70° C. over 60 minutes. Then the reaction mixture was further maintained at 70° C. for 2 hours to end the graft polymerization onto the compound rubber. From the obtained graft copolymer latex, a dry powder of compound-rubber-based graft copolymer (hereinafter designated as S-21) was obtained through coagulation, separation, and drying treatment in the same manner as in Reference Example 1.

Another dry power of compound-rubber-based graft copolymer (hereinafter designated as S-22) was obtained according to the above procedure except that a mixture of 10 parts of methyl methacrylate and 0.04 part of cumene hydroperoxide was added to this compound rubber latex.

REFERENCE EXAMPLE 13

A mixture of 30 parts of methyl methacrylate and 0.08 part of cumene hydroperoxide was added dropwise to 215 parts each of the compound rubber latexes (prepared in Reference Examples 7 and 8, respectively) at 70° C. over 60 minutes, and the reaction mixture was further maintained at 70° C. for 2 hours to end the graft polymerization onto the compound rubber. From the thus obtained latexes, dry powders of compound-rubber-based graft copolymers (hereinafter designated as S-23 and S-24) were obtained through coagulation, separation, and drying treatment in the same manner as in Reference Example 1.

EXAMPLES 1-4 AND COMPARATIVE EXAMPLES 1-5

Eight different resin compositions (Examples 1-4 and Comparative Examples 1-4) were prepared by blending 9.0 wt % each of graft copolymers S-1 through S-6, S-9, and S-10 obtained in Reference Examples 1-6 (except 4) with 43.7 wt % of poly(2,6-dimethyl-1,4-phenylene)ether having a reduced viscosity ($\eta sp/C$) of 0.59 dl/g (measured in chloroform at 25° C.) and 47.3 wt % of polystyrene having a melt index of 30 g/10 minutes (200° C., 5 kg load). In addition, a resin composition (Comparative Example 5) was prepared by blending 48 wt % of the above-mentioned poly(2,6-dimethyl-1,4-phenylene)ether with 52 wt % of the above-mentioned polystyrene.

Each of these nine resin compositions was fed into a twin-screw extruder (model ZSK-30, supplied by Werner & Pfleiderer Cor.), melt-mixed at a cylinder temperature of 280° C., and pelletized. Pellets from each resin composition were fed into an injection molding machine (model SJ-35, supplied by Meiki Seisakusho Co., Ltd.), and injection-molded at a cylinder temperature of 280° C. and a mold temperature of 60° C., giving specimens for different tests. Results of evaluating properties of these specimens are shown in Table 1.

ponent in improving the compatibility of the polyphenylene ether resin with the styrene resin.

EXAMPLES 5 and 6

Resin compositions were prepared by blending 9.0 wt % each of S-7 and S-8, compound-rubber-based graft copolymers obtained in Reference Example 4, with 43.7 wt % of the same poly(2,6-dimethyl-1,4-phenylene)ether as used in Example 1 and 47.3 wt % of the same polystyrene as used in Example 1. Specimens for different tests were formed from these two resin compositions by operating the twin-screw extruder and injection molding machine used in Example 1 under the same conditions as in Example 1, and properties of these specimens were evaluated. Results thereof are shown in Table 2.

TABLE 1

|  | Graft copolymer used | Flexural strength (kg/cm$^2$) | Izod impact strength (¼" notched, 23° C.) (kg · cm/cm) | Vicat softening temperature (°C.) | Gloss (60° specular gloss) (%) |
| --- | --- | --- | --- | --- | --- |
| Example 1 | S-1 | 910 | 22.4 | 137 | 94.0 |
| Example 2 | S-2 | 900 | 20.5 | 137 | 93.2 |
| Example 3 | S-4 | 900 | 15.3 | 136 | 93.6 |
| Example 4 | S-5 | 890 | 21.0 | 138 | 89.3 |
| Compar. Example 1 | S-3 | 820 | 5.2 | 137 | 94.2 |
| Compar. Example 2 | S-6 | 920 | 18.6 | 137 | 67.4 |
| Compar. Example 3 | S-9 | 890 | 6.5 | 138 | 68.3 |
| Compar. Example 4 | S-10 | 900 | 4.1 | 137 | 65.2 |
| Compar. Example 5 | — | 1050 | 3.7 | 138 | 91.4 |

Test results of Example 1 and those of Comparative Example 5 prove that moldings from the resin composition of Example 1 have markedly-improved impact resistance.

Table 2 proves that the impact resistance and surface gloss of the moldings are excellent regardless of a considerable change in the amount of styrene graft-polymerized onto the compound rubber.

TABLE 2

|  | Graft copolymer used | Flexural strength (kg/cm$^2$) | Izod impact strength (¼" notched, 23° C.) (kg · cm/cm) | Vicat softening temperature (°C.) | Gloss (60° specular gloss) (%) |
| --- | --- | --- | --- | --- | --- |
| Example 5 | S-7 | 880 | 21.6 | 138 | 91.2 |
| Example 6 | S-8 | 910 | 18.3 | 137 | 93.4 |

Test results of Examples 1–4 and those of Comparative Examples 1 and 2 reveal that no molding having superior properties can be obtained unless the polyorganosiloxane rubber content in the compound rubber is within the range of 10 to 90% by weight.

Secondly, when a powder of S-9, the polybutyl acrylate rubber of which contains no crosslinking agent, is used as a graft copolymer (Comparative Example 3), the moldings are inferior in impact resistance and surface gloss. This is because the gel content in the backbone polymer of the graft copolymer is low, that is, the backbone polymer is not such a compound rubber as used in the present invention.

Further, results of Comparative Example 4, wherein a powder of S-10 was used, prove that none of improved impact resistance and surface gloss can be obtained by using such a graft copolymer that only n-butyl acrylate and styrene, which are also used for the preparation of S-1, are graft-polymerized onto a polyorganosiloxane rubber. This seems to be due to the non-compound rubber structure of the backbone polymer of S-10 and due to the ineffectiveness of the grafted com-

EXAMPLES 7–14 AND COMPARATIVE EXAMPLE 6

Three-component resin compositions were prepared by blending te compound-rubber-based graft copolymer (S-1) obtained in Reference Example 1, the same poly(2,6-dimethyl-1,4-phenylene)ether as used in Example 1, and the same polystyrene as used in Example 1, in proportions shown in Table 3 (Examples 7–14).

A two-component resin composition was prepared by blending the same poly(2,6-dimethyl-1,4-phenylene)ether as used in Example 1 and a high-impact polystyrene containing 8 wt % of polybutadiene and 13.3 wt % of gel, in proportions shown in Table 3 (Comparative Example 6).

Specimens for different tests were formed from these nine different resin compositions by operating the twin-screw extruder and injection molding machine used in Example 1 under the same conditions as in Example 1, and properties of these specimens were evaluated. Results thereof are shown in Table 3.

TABLE 3

Mixing proportion of each component of resin composition

| | Compound-rubber-based graft copolymer S-1 (wt %) | Poly(2,6-dimethyl-1,4-phenylene)ether (wt %) | Polystyrene (wt %) | High-impact polystyrene (wt %) | Rubber content in resin composition (wt %) |
|---|---|---|---|---|---|
| Example 7 | 4 | 46 | 50 | — | 2.8 |
| Example 8 | 6 | 45 | 49 | — | 4.2 |
| Example 9 | 11 | 43 | 46 | — | 7.7 |
| Example 10 | 13 | 41.8 | 45.2 | — | 9.1 |
| Example 11 | 11 | 36 | 53 | — | 7.7 |
| Example 12 | 11 | 28 | 60 | — | 7.7 |
| Example 13 | 7.5 | 60 | 32.5 | — | 5.3 |
| Example 14 | 10 | 60 | 30 | — | 7.0 |
| Compar. Example 6 | — | 45 | — | 55 | 4.4 |

| Izod impact strength (¼″ notched, 23° C.) (kg·cm/cm) | Vicat softening temperature (°C.) | Melt index (5 kg load, 275° C.) (g/10 min) | Gloss (60° specular gloss) (%) |
|---|---|---|---|
| 8.7 | 135 | 11.9 | 94.8 |
| 15.3 | 137 | 12.9 | 93.6 |
| 24.6 | 134 | 9.7 | 94.1 |
| 25.6 | 135 | 10.5 | 95.6 |
| 18.4 | 128 | 16.0 | 94.0 |
| 17.2 | 125 | 17.2 | 93.4 |
| 22.4 | 155 | 3.6 | 91.4 |
| 27.1 | 158 | 3.0 | 90.2 |
| 8.3 | 127 | 6.2 | 48.6 |

As is evident from results of Examples 7–14 shown in Table 3, the impact resistance of moldings becomes higher as the proportion of the compound-rubber-based graft copolymer (S-1) is increased. It also can be seen that the heat resistance of moldings which is represented by the Vicat softening temperature becomes higher as the proportion of poly(2,6-dimethyl-1,4-phenylene)ether is increased. In the second place, the impact strength-improving effect of the compound rubber contained in the graft copolymer (S-1) was compared with that of the rubber contained in the high-impact polystyrene. The content of the compound rubber in the composition of Example 8 was 4.2% by weight while the content of polybutadiene rubber in the composition of Comparative Example 6 was 4.4% by weight. On the other hand, the Izod impact strength of test specimens of Example 8 and that of test specimens of Comparative Example 6 were 15.3 kg·cm/cm and 8.3 kg·cm/cm, respectively. This proves that the compound rubber is superior to the polybutadiene rubber in impact strength-improving effect.

Table 4 shows results of measuring low-temperature Izod impact strengths at −30° C. and −60° C. of the same Izod-test specimens as used in Example 8 and Comparative Example 6 and also results of measuring those at 23° C.

As is evident from Table 4, the polyphenylene ether resin composition of the present invention provides moldings superior in low-temperature impact strength to those provided by the polyphenylene ether resin composition containing a high-impact polystyrene.

TABLE 4

| Izod test specimens used | Izod impact strength (¼″ notched) | | |
|---|---|---|---|
| | 23° C. (kg·cm/cm) | −30° C. (kg·cm/cm) | −60° C. (kg·cm/cm) |
| Test specimens of Example 8 | 15.3 | 12.6 | 10.4 |
| Test specimens of Compar. Example 6 | 8.3 | 5.7 | 3.4 |

EXAMPLE 15

264 Parts of the compound rubber latex obtained in Reference Example 1 was charged in a separable flask equipped with a stirrer, and after replacement of the air with nitrogen, the temperature of the latex was raised to 65° C. Then, a mixture of 30 parts of styrene, 10 parts of acrylonitrile, and 0.08 part of t-butyl hydroperoxide was added and the resulting mixture was stirred for 30 minutes. Further a mixture of 0.1 part of Rongalite, 0.0002 part of ferrous sulfate, 0.0004 part of disodium ethylenediaminetetraacetate, and 5 parts of distilled water was added to initiate the radical polymerization. After maintaining of the reaction temperature for 2 hours, the reaction mixture was cooled to end the polymerization. In this graft polymerization, the polymerization yield based on the total amount of styrene and acrylonitrile used was 98.5%. The polymer was coagulated by adding the resulting latex dropwise to 456 parts of hot water containing 2 wt % of magnesium sulfate, and the coagulated polymer was separated, washed, and dried at 75° C. for 10 hours, yielding a dry powder of compound-rubber-based graft copolymer (hereinafter designated as S-11).

Then, a resin composition was prepared by blending together this dry powder of S-11, the same poly(2,6-dimethyl-1,4-phenylene)ether as used in Example 1, and the same polystyrene as used in Example 1 so that the respective proportions thereof might be 11 wt %, 44 wt %, and 45 wt %. Specimens for different tests were formed from this resin composition by operating the twin-screw extruder and injection molding machine used in Example 1 under the same conditions as in Example 1, and properties of the specimens were evaluated. Results thereof are shown in Table 5.

TABLE 5

| | Graft copolymer used | Izod impact strength (¼" notched, 23° C.) (kg · cm/cm) | Vicat softening temperature (°C.) | Melt index (5 kg load, 275° C.) (g/10 min) |
|---|---|---|---|---|
| Example 15 | S-11 | 17.8 | 140 | 8.6 |

As is evident from Table 5, a polyphenylene ether resin composition which provides molded products superior in heat resistance and impact resistance and is superior in flow properties can also be obtained when the grafted resin component of the compound-rubber-based graft copolymer is constituted of styrene and acrylonitrile.

COMPARATIVE EXAMPLE 7

It was tried to improve a polyphenylene ether resin by blending it with a copolymer constituted of a polyorganosiloxane and styrene. That is, 10 parts of tetramethyltetravinylcyclotetrasiloxane, 90 parts of octamethylcyclotetrasiloxane, and 0.2 part of hexamethylsiloxane were mixed together, and heated in the preence of potassium hydroxide as a catalyst at 150° C. for 5 hours, giving a liquid polyorganosiloxane having a viscosity of 6,000 cp.

8 Parts of this polyorganosiloxane, 92 parts of styrene, and 1 part of t-butyl peracetate were mixed together and reacted at 100° C. for 3 hours under purging with nitrogen, giving a white viscous fluid. To this fluid were added 0.4 part of polyvinyl alcohol, 300 parts of water, and 4 parts of di-t-butyl peroxide. After replacement of the air with nitrogen, the mixture was reacted by heating at 120° C. for 3 hours and then at 140° C. for 1 hour, yielding suspension polymer particles.

50 Parts of this polymer particles and 50 parts of the same poly(2,6-dimethyl-1,4-phenylene)ether as used in Example 1 were mixed together, melted, and molded to prepare test specimens in the same manner as in Example 1. As a result of evaluating properties of these specimens, the Izod impact strength (¼" notched, at 23° C.) and the surface gloss were as low as 4.6 kg·cm/cm and 53%, respectively.

COMPARATIVE EXAMPLE 8

It was tried to improve a polyphenylene ether resin by blending it with a graft copolymer resulting from graft polymerizing styrene onto a polybutyl acrylate rubber.

That is, a mixture of 58.2 parts of n-butyl acrylate, 1.8 parts of allyl methacrylate, and 0.1 part of t-butyl hydroperoxide was emulsified in 200 parts of distilled water containing 1 part of sodium dodecylbenzenesulfonate. After replacement of the air with nitrogen, the emulsion was heated to 60° C., and a redox type of radical polymerization initiator was added to initiate the polymerization. After completion of the polymerization of n-butyl acrylate, a mixture of 40 parts of styrene and 0.1 part of t-butyl hydroperoxide was added dropwise to graft polymerize the styrene. After completion of the polymerization, a graft copolymer was obtained through coagulation, washing, and drying.

20 Parts of this graft copolymer, 40 parts of the same poly(2,6-dimethyl-1,4-phenylene)ether as used in Example 1 and 40 parts of the same polystyrene as used in Example 1 were mixed together, melted, and molded to prepare test specimens in the same manner as in Example 1. As a result of evaluating properties of these specimens, the Izod impact strength (¼" notched, at 23° C.) and the surface gloss were as low as 4.2 kg·cm/cm and 46%, respectively.

COMPARATIVE EXAMPLES 9 and 10

Each (9.0 wt %) of the compound-rubber-based graft copolymers (S-12) and (S-13) obtained in Reference Examples 7 and 8, respectively, was blended with 43.7 wt % of the same poly(2,6-dimethyl-1,4-phenylene)ether as used in Example 1 and 47.3 wt % of the same polystyrene as used in Example 1. From these two types of resin compositions, specimens for different tests were prepared by operating the twin-screw extruder and injection molding machine used in Example 1 under the same conditions as in Example 1. Results shown in Table 6 were obtained from evaluating properties of these specimens.

Results shown in Table 6 prove that the compound-rubber-based graft copolymer (S-12) is ineffective for providing impact resistance since the average particle diameter of the compound rubber is as small as 0.07 μm, and that the compound-rubber-based graft copolymer (S-13) is little effective for providing impact resistance and affords low surface gloss, since the average particle diameter of the compound rubber is as large as 0.7 μm.

TABLE 6

| | Graft copolymer used | Flexural strength (kg/cm²) | Izod impact strength (¼" notched, 23° C.) (kg · cm/cm) | Vicat softening temperature (°C.) | Gloss (60° specular gloss) (%) |
|---|---|---|---|---|---|
| Compar. Example 9 | S-12 | 880 | 7.8 | 137 | 91.2 |
| Compar. Example 10 | S-13 | 900 | 8.6 | 136 | 82.1 |

COMPARATIVE EXAMPLE 11

9.0 wt % of the blended-rubber-based graft copolymer (S-14) obtained in Reference Example 9 was blended with 43.7 wt % of the same poly(2,6-dimethyl-1,4-phenylene)ether as used in Example 1 and 47.3 wt % of the same polystyrene as used in Example 1. From the resulting resin composition specimens for different tests were prepared by operating the twin-screw extruder and injection molding machine used in Example 1 under the same conditions as in Example 1. Results shown in Table 7 were obtained from evaluating properties of these specimens.

It can be seen from Table 7 that the resin composition containing the blended-rubber-based graft copolymer is inferior to the resin composition of the present invention in the impact resistance and gloss of molded products.

Test results of Comparative Examples 14 and 15 prove that the compound-rubber-based graft copolymer S-23 does not provide high impact resistance since the average particle diameter of the compound rubber is as small as 0.07 μm and the graft copolymer S-24 provides low impact resistance and surface gloss since the average particle diameter, on the contrary, is as large as 0.7 μm.

TABLE 7

|  | Graft copolymer used | Flexural strength (kg/cm$^2$) | Izod impact strength (¼" notched, 23° C.) (kg · cm/cm) | Vicat softening temperature (°C.) | Gloss (60° specular gloss) (%) |
|---|---|---|---|---|---|
| Compar. Example 11 | S-14 | 890 | 6.5 | 137 | 58.0 |

TABLE 8

|  | Graft copolymer used | Flexural strength (kg/cm$^2$) | Izod impact strength (¼" notched, 23° C.) (kg · cm/cm) | Vicat softening temperature (°C.) | Gloss (60° specular gloss) (%) |
|---|---|---|---|---|---|
| Example 16 | S-15 | 890 | 18.6 | 135 | 89.6 |
| Example 17 | S-16 | 900 | 17.4 | 134 | 88.2 |
| Example 18 | S-18 | 910 | 17.7 | 135 | 90.4 |
| Example 19 | S-19 | 880 | 20.2 | 135 | 88.6 |
| Example 20 | S-21 | 900 | 18.3 | 136 | 91.4 |
| Example 21 | S-22 | 890 | 20.6 | 134 | 89.4 |
| Comparative Example 12 | S-17 | 910 | 6.3 | 135 | 91.5 |
| Comparative Example 13 | S-20 | 900 | 15.4 | 134 | 54.3 |
| Comparative Example 14 | S-23 | 900 | 6.6 | 134 | 89.2 |
| Comparative Example 15 | S-24 | 890 | 7.6 | 135 | 72.6 |

EXAMPLES 16–21 AND COMPARATIVE EXAMPLES 12–15

Ten different resin compositions were prepared by blending 11.0 wt % each of the compound-rubber-based graft copolymers S-15 through S-24 (obtained in Reference Examples 10–13) with 43 wt % of the same poly(2,6-dimethyl-1,4-phenylene)ether and 46 wt % of the same polystyrene as used in Examples 1–4.

These resin compositions were each fed into the above-said twin screw extruder, melt-mixed at a cylinder temperature of 280° C., and pelletized. These pellets were dried, and molded into specimens for different tests by using the above-said injection molding machine. Results shown in Table 8 were obtained from evaluating properties of the specimens.

Test results of Examples 16–19 and of Comparative Examples 12 and 13 prove that no molded product having good properties can be obtained unless the polyorganosiloxane rubber content in the compound rubber is within the range of 10 to 90% by weight.

Test results of Examples 20 and 21 reveal that the impact resistance and surface gloss of the molded products are also excellent when the amount of methyl methacrylate graft-polymerized onto the compound rubber is considerably varied.

EXAMPLES 22–25

Flame-retardant polyphenylene ether resin compositions were prepared by using compound-rubber-based graft copolymers S-1 and S-15 obtained in Reference Examples 1 and 10, respectively. That is, two resin compositions (Examples 22 and 23) were prepared by blending 8.4 wt % each of the graft copolymers S-1 and S-15 with 56.8 wt % of the same poly(2,6-dimethyl-1,4-phenylene)ether as used in Examples 1–4, 29.5 wt % of polystyrene having a melt index of 3 g/10 minutes (200° C., 5 kg load), and 5.3 wt % of triphenyl phosphate. Further, two resin compositions (Examples 24 and 25) were prepared by blending 8 wt % each of the graft copolymers S-1 and S-15 with 60 wt % of the above-mentioned poly(2,6-dimethyl-1,4-phenylene)ether, 22 wt % of the above-mentioned polystyrene, and 10 wt % of triphenyl phosphate.

These four resin compositions were each fed into the above-said twin-screw extruder, melt-mixed at a cylinder temperature of 280° C., and pelletized. The obtained pellets were dried, and molded into specimens for different tests by using the above-said injection molding machine at a cylinder temperature of 280° C. and a mold temperature of 60° C. Results of evaluating properties of these specimens are shown in Table 9.

TABLE 9

|  | Component content (wt %) in resin composition | | | | Izod impact strength (¼" notched, 23° C.) (kg · cm/cm) |
|---|---|---|---|---|---|
|  | Graft copolymer | Poly (2,6-dimethyl-1,4-phenylene)ether | Polystyrene | Triphenyl phosphate |  |
| Example 22 | S-1 8.4 | 56.8 | 29.5 | 5.3 | 19.3 |

TABLE 9-continued

| | | | | | |
|---|---|---|---|---|---|
| Example 23 | S-15 8.4 | " | " | " | 16.6 |
| Example 24 | S-1 8.0 | 60.0 | 22 | 10 | 20.6 |
| Example 25 | S-15 8.0 | " | " | " | 17.4 |

| Flammability (1/16" thickness) | |
|---|---|
| Average burning time (sec) | UL-94 rating |
| 12.1 | V-1 |
| 14.8 | " |
| 4.3 | V-0 |
| 5.5 | " |

Test results of Examples 22–25 prove that resin compositions comprising the compound-rubber-based graft copolymer, poly(2,6-dimethyl-1,4-phenylene)ether, polystyrene, and triphenyl phosphate in such proportions as shown in Table 9 provide superior impact resistance and flame retardance meeting a flammability rating of UL-94 V-0 or V-1 at a specimen thickness of 1/16".

EXAMPLES 26–31

Resin compositions reinforced with glass fiber were prepared by using compound-rubber-based graft copolymers S-1 and S-15 obtained in Reference Examples 1 and 10, respectively.

That is, two resin compositions (Examples 26 and 27) were prepared by blending 6.4 wt % each of the graft copolymers S-1 and S-15 with 41.6 wt % of the same poly(2,6-dimethyl-1,4-phenylene)ether as used in Examples 1–4, 32 wt % of polystyrene having a melt index of 6 g/10 minutes (200° C., 5 kg load), and 20 wt % of glass fiber (chopped strands RES 03-TP 68, supplied by Nippon Sheet Glass Company, Limited).

Further, four resin compositions (Examples 28–31) were prepared by incorporating different amounts of the glass fiber.

In the same manner as in Example 1, these resin compositions were pelletized by using the above-said twin-screw extruder and then molded into specimens for different tests by using the above-said injection molding machine. Results of evaluating properties of these specimens are shown in Table 10.

Test results of Examples 26–31 prove that resin compositions comprising the compound-rubber-based graft copolymer, poly(2,6-dimethyl-1,4phenylene)ether, polystyrene, and glass fiber in such proportions as shown in Table 10 provide excellent mechanical strength and high heat resistance.

TABLE 10

| | Component content (wt %) in resin composition | | | | Izod impact strength (¼" notched, 23° C.) (kg · cm/cm) |
|---|---|---|---|---|---|
| | Graft copolymer | Poly (2,6-dimethyl-1,4-phenylene)ether | Polystyrene | Glass fiber | |
| Example 26 | S-1 6.4 | 41.6 | 32.0 | 20.0 | 6.7 |
| Example 27 | S-15 6.4 | " | " | " | 5.8 |
| Example 28 | S-1 5.6 | 31.4 | 28.0 | 30.0 | 7.0 |
| Example 29 | S-15 5.6 | " | " | " | 6.5 |
| Example 30 | S-1 7.2 | 46.8 | 36.0 | 10.0 | 8.2 |
| Example 31 | S-15 7.2 | " | " | " | 7.7 |

| Vicat softening temperature (°C.) | Flexural property (kg/cm$^2$) | |
|---|---|---|
| | Strength | Modulus |
| 153 | 1620 | 60,000 |
| 151 | 1530 | 57,000 |
| 153 | 1650 | 71,000 |
| 153 | 1620 | 67,000 |
| 152 | 1340 | 35,000 |
| 151 | 1300 | 34,000 |

EXAMPLES 32–37

Flame-retardant resin compositions reinforced with glass fiber were prepared by using compound-rubber-based graft copolymers S-1 and S-15 obtained in Reference Examples 1 and 10, respectively.

That is, two resin compositions (Examples 32 and 33) were prepared by blending 3.2 wt % each of the graft copolymers S-1 and S-15 with 56 wt % of the same poly(2,6-dimethyl-1,4-phenylene)ether as used in Examples 1–4, 16 wt % of polystyrene having a melt index of 6 g/10 minutes (200° C., 5 kg load), 4.2 wt % of triphenyl phosphate, and 20 wt % of the same glass fiber as used in Examples 26–31.

Further, four resin compositions (Examples 34–37) were prepared by incorporating different amounts of triphenyl phosphate and different amounts of the glass fiber.

In the same manner as in Example 1, these resin compositions were pelletized by using the abovesaid twin-screw extruder, and molded into specimens for different tests by using the above-said injection molding machine. Results of evaluating properties of these specimens are shown in Table 11.

Test results of Examples 32–37 prove that resin compositions comprising the compound-rubberbased graft copolymer, poly(2,6-dimethyl-1,4-phenylene)ether, polystyrene, triphenyl phosphate, and glass fiber in such proportions as shown in Table 11 provide excellent mechanical strength and high flame resistance.

TABLE 11

| | Component content (wt %) in resin composition | | | | | Izod impact strength (¼" notched, 23° C.) (kg·cm/cm) |
|---|---|---|---|---|---|---|
| | Graft copolymer | Poly(2,6-dimethyl-1,4-phenylene)-ether | Poly-styrene | Glass fiber | Triphenyl phosphate | |
| Example 32 | S-1 3.2 | 56 | 16 | 20 | 4.8 | 6.6 |
| Example 33 | S-15 3.2 | " | " | " | " | 6.0 |
| Example 34 | S-1 2.6 | 43.1 | 19.6 | 30 | 3.9 | 7.0 |
| Example 35 | S-15 2.6 | " | " | " | " | 6.3 |
| Example 36 | S-1 3.6 | 63 | 18 | 10 | 5.4 | 8.3 |
| Example 37 | S-1 2.6 | 43.1 | 15.7 | 30 | 7.8 | 6.8 |

| Flexural property (kg/cm$^2$) | | Flammability (1/16" thickness) | |
|---|---|---|---|
| Strength | Modulus | Average burning time (sec) | UL-94 rating |
| 1540 | 61,000 | 6.5 | V-1 |
| 1510 | 58,000 | 10.3 | " |
| 1690 | 89,000 | 11.5 | " |
| 1710 | 88,000 | 12.0 | " |
| 1230 | 36,000 | 7.4 | " |
| 1450 | 78,000 | 3.9 | V-0 |

EFFECT OF THE INVENTION

According to the present invention, it is possible to obtain a polyphenylene ether resin composition which provides molded products superior in impact resistance, heat resistance, mechanical strength, and surface appearance and is superior in moldability and flow properties, since the composition is produced by blending a polyphenylene ether resin with a polystyrene resin and a specific graft copolymer defined in the present text.

What is claimed is:

1. A polyphenylene ether resin composition comprising
   (A) a polyphenylene ether resin,
   (B) a polystyrene resin, and
   (C) a graft copolymer
prepared by graft-polymerizing one or more vinyl monomers onto a compound rubber having an average particle diameter of 0.08 to 0.6 μm and a structure wherein 10 to 90% by weight of a polyorganosiloxane rubber component and 90 to 10% by weight of a polyalkyl (meth)acrylate rubber component are tangled with each other so as not to separate, the total amount of the polyorganosiloxane rubber component and the polyalkyl (meth)acrylate rubber component being 100% by weight of the compound rubber.

2. The polyphenylene ether resin composition of claim 1, wherein the compound rubber consists of
   a polyorganosiloxane rubber component prepared from an organosiloxane, and a crosslinking agent by emulsion polymerization and
   a polyalkyl (meth) acrylate rubber component prepared by impregnating the polyorganosiloxane rubber with an (meth)acrylate, a crosslinking agent, and a graft-linking agent, followed by polymerizing the acrylate together with these agents.

3. The polyphenylene ether resin composition of claim 1, wherein the gel content of the compound rubber is at least 80% by weight as measured by extraction with toluene.

4. The polyphenylene ether resin composition of claim 1, wherein the vinyl monomer is an aromatic alkenyl compound.

5. The polyphenylene ether resin composition of claim 4, wherein the aromatic alkenyl compound is styrene.

6. The polyphenylene ether resin composition of claim 1, wherein the vinyl monomer is a methacrylate.

7. The polyphenylene ether resin composition of claim 6, wherein the methacrylate is methyl methacrylate.

8. The polyphenylene ether resin composition of claim 1, which is composed of 20 to 80% by weight of component (A), 19 to 75% by weight of component (B), and 1 to 40% by weight of component (C).

9. The polyphenylene ether resin composition of claim 1, wherein the compound rubber consists of
   a polyorganosiloxane rubber component prepared from an organosiloxane, a crosslinking agent and a graft-linking agent by emulsion polymerization and
   a polyalkyl (meth)acrylate rubber component prepared by impregnating the polyorganosiloxane rubber with an alkyl (meth)acrylate, a crosslinking agent, and a graft-linking agent, followed by polymerizing the acrylate together with these agents.

10. The polyphenylene ether resin composition of claim 1, 2 or 9, wherein the main skeleton of the polyorganosiloxane rubber component has repeating dimethylsiloxane units and the main skeleton of the polyalkyl (meth)acrylate rubber component has repeating n-butyl acrylate units.

* * * * *